June 21, 1932. G. D. MOOMAW 1,864,087
RECUPERATOR
Filed March 29, 1930 2 Sheets-Sheet 2
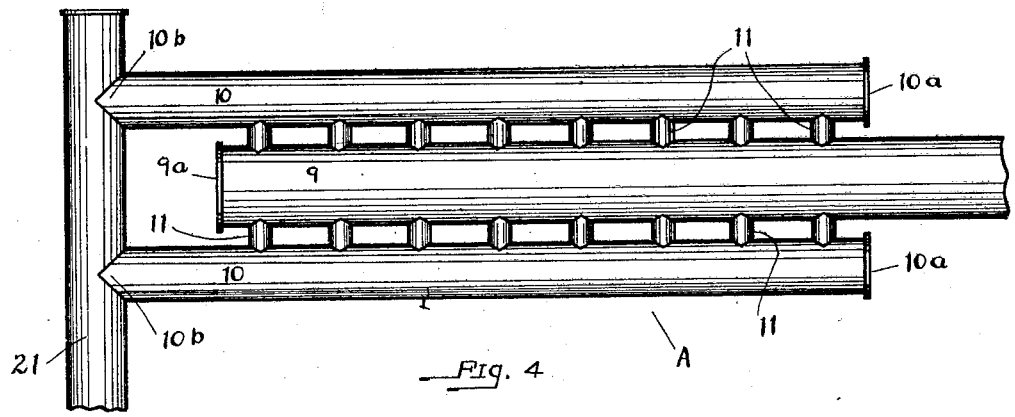
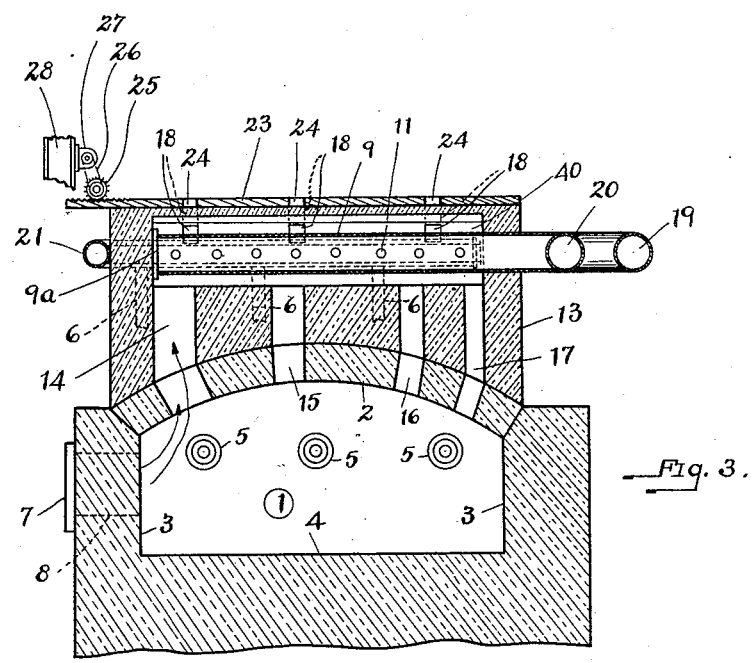
INVENTOR
George D. Moomaw
by Christy, Christy and Wharton
his attorneys Patented June 21, 1932

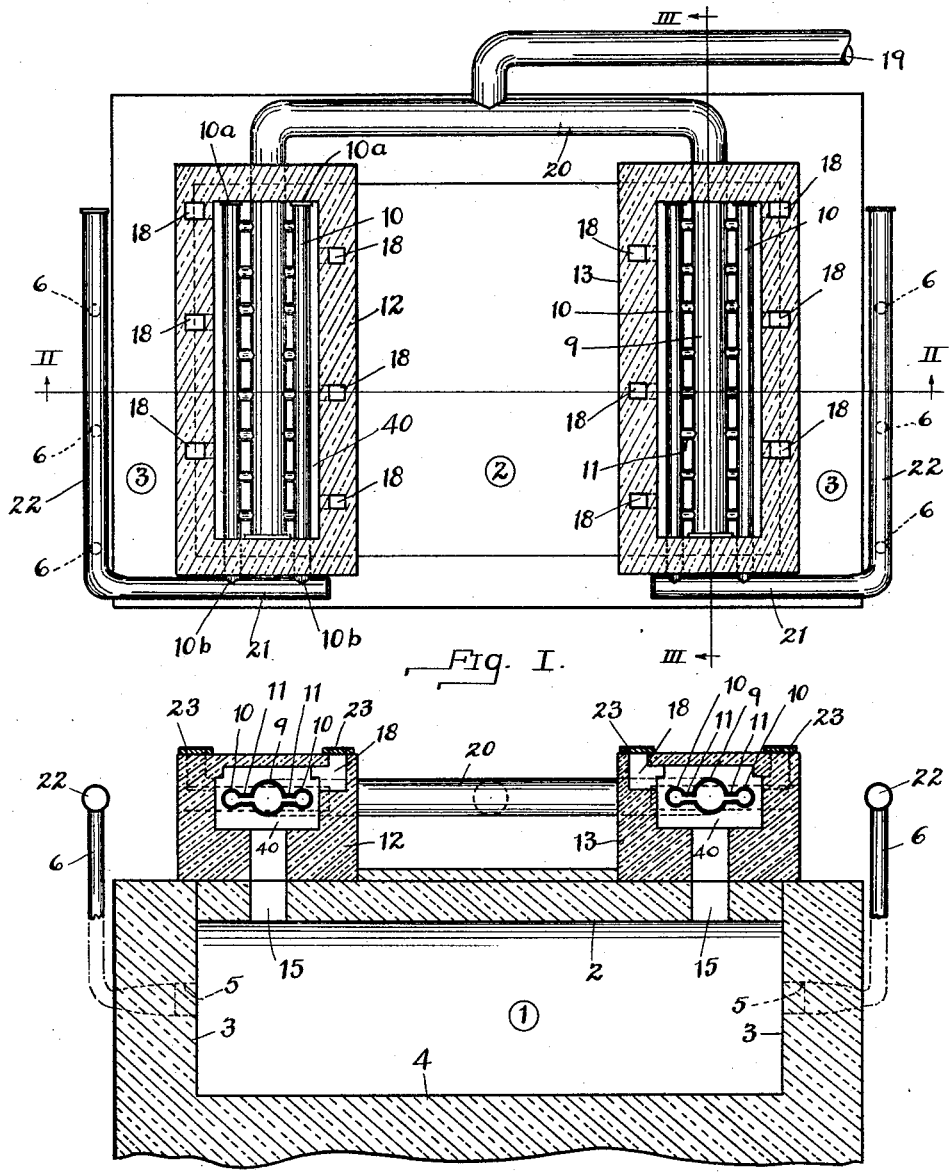

1,864,087

UNITED STATES PATENT OFFICE

GEORGE D. MOOMAW, OF SYRACUSE, NEW YORK

RECUPERATOR

Application filed March 29, 1930. Serial No. 440,016.

My invention relates to furnaces, and particularly to a recuperator which, together with complementary furnace structure, is effective to increase the efficiency of the furnace.

Upon remarking that the invention may be included effectively with coal-burning furnaces, gas-burning furnaces, and with furnaces which obtain their draft from stacks, I proceed to describe the invention in embodiment with a furnace which burns oil and operates without a stack. An oil-burning, "stackless" furnace is relatively inexpensive to construct, and for this reason alone many furnaces of this type have been used in the past. It is to be understood that in an oil-burning furnace, air at super-atmospheric pressure (say a pressure of 16 ounces per square inch) is required for the atomization of the fuel oil. A blower is used to supply such air to the burners of the furnace. To obtain better combustion and higher over-all efficiency, this air is passed under pressure through a recuperator and preheated. Recuperator structures which have, hitherto, been effective to give the desired degree of pre-heating to the air, have also been instrumental in causing an undesirable loss of the velocity head or pressure of the air flowing therethrough. This loss of pressure or loss of velocity head within the recuperator has in the past necessitated the utilization of a larger blower than otherwise would have been employed. Therefore, the power for operating the blowers and the cost of operating the furnace were greater than they would have been, if no such pressure loss had resulted within the recuperator. On the other hand, if the recuperator in use were such as to function without seriously affecting the air pressure, it was inadequate to heat the air to the desired degree.

The object of my invention is to provide a recuperator which will sufficiently preheat the air of combustion for a furnace without causing an excessive diminution of the air pressure, such a diminution in pressure as to require a larger blower than would otherwise be used.

A further object of the invention is to adapt the structure of a furnace to my recuperator, and in so adapting the structure to provide a furnace in which the heat losses are minimized and the efficiency is increased.

In the accompanying drawings Fig. 1 is a view of the top of a steel-heating furnace, showing in cross-section two recuperator chambers which are arranged on top of the furnace; Fig. 2 is a view in cross-section through the furnace, taken on the plane of line II—II, Fig. 1; Fig. 3 is a further cross-sectional view of the furnace, taken on the plane III—III of Fig. 1; and Fig. 4 is a view in plan elevation of a recuperator element of my invention.

In the drawings, I have illustrated a heating furnace, including the heating chamber 1 which is defined by the roof 2, walls 3, and hearth 4. According to custom, the furnace is built of refractory bricks which may be suitably reinforced with tie-rods and buckstays (not shown). A plurality of burners 5 is indicated diagrammatically at each end of the furnace. Associated with each burner is a pipe 6 for the conduction of preheated air to the burner. As will presently appear, means are provided for preheating this air under pressure. Such air serves, during its passage from each pipe 6 and through the associated burner, to atomize the fluid fuel and to project it into the chamber 1 for combustion. Of course, the air is further useful in supporting combustion.

A door 7 (Fig. 3) is movable to uncover an entry 8, which entry 8 permits the charging of material to be heated into the heating chamber. Thermostatic instrumentalities, which are known to the art, are organized with the burners to control their operation and to regulate the temperature within the furnace.

For purposes of illustration, I shall assume that it is desirable to maintain the temperature of chamber 1 at 2000° F. As mentioned above, the fuel-oil in passing through the burners is atomized and mixed with the preheated air, and upon entering the chamber 1 combustion of the fuel takes place. Such combustion continues so long as the thermostatic instrumentalities which regulate the burners permit fuel and air to pass from the burners into the furnace. When the temperature of the chamber 1 reaches 2000° F., the above mentioned instrumentalities operate to decrease or cut off the flow of the mixture of fuel and air to the furnace. Upon such cutting off of the fuel the furnace starts to cool, and continues to cool until it reaches the temperature at which the thermostatic instrumentalities are adjusted to cause combustion to begin again. So, heat is supplied to the furnace, and its temperature is regulated. Manifestly, if all doors and flues of the furnace are closed when the burners are shut off or when the furnace is cooling, the heat losses of the furnace will be minimum, and the amount of fuel consumed for the maintenance of the chamber 1 at a predetermined temperature will be correspondingly minimized. Presently, I shall describe the structure of my invention which tends to prevent such heat losses.

The air for combustion, which in the case of oil-burning furnaces is the air for atomization of the fuel as well as the air for combustion, essentially is preheated in one or more recuperators. Such preheating of air in recuperators has been the practice for years, but, to preheat the air sufficiently and without seriously reducing its pressure or velocity head is the new and remarkable characteristic of my recuperator. This characteristic may be attributed to the structure of the recuperator pipe member for conducting the air through the flue gases of the furnace. Fig. 4 illustrates my recuperator pipe member which is indicated generally by the letter A. It consists in structure of an inlet pipe 9, lateral pipes 10, and a plurality of nipples 11, interconnecting the pipes 9 and 10. Advantageously, these pipes are formed of high heat-resisting metal. The pipe member A is positioned to extend across the path of the hot products of combustion which flow from the furnace. Consequently, there is effected a transfer of heat from the products of combustion to the air flowing through the recuperator pipe member. Usually a recuperator chamber is provided for the recuperator piping, and the products of combustion of the furnace are caused to pass through this recuperator chamber and so to heat the recuperator piping.

In a "stackless furnace", I find it advantageous to locate the recuperator chamber immediately above the heating chamber, such as the chamber 1. A plurality of recuperators may be used with a single furnace, and in small furnaces, such as the one illustrated, I have found it convenient to employ two recuperator chambers 12 and 13, one being located adjacent each end of the furnace. The chambers 12 and 13 are formed of refractory brick, and each includes a recess 40 in which a recuperator pipe member A is secured, as shown in Figs. 1–3. A plurality of passages 14, 15, 16 and 17 extend upward from the chamber 1, through the roof 2, and to the recess 40 of each recuperator chamber. The hot products of combustion ascend from the chamber 1, by way of these passages, to the recesses 40, and after passing upwardly, around, and between the metal pipes 9, 10 and 11 of the members A, and surrendering thereto much of their heat, these hot gases find outlet to the atmosphere through ports 18.

The air to be heated in the recuperators is forced under pressure from a blower (not shown) through the conduit 19 to the inlet pipe 20 (Fig. 1). From the pipe 20 the air flows into the pipes 9 of the two recuperator members A. It is noteworthy that the air in passing through the conduits 19 and 20 is subject to few turns, (it being remembered that turns in a conduit cause a pressure drop or a loss in velocity head of the fluid flowing therein) and that inasmuch as the conduits 19 and 20 are formed of smooth metal, the pressure losses of the flowing air will be minimum. It will be noted that the nipples 11 are each of small cross-sectional area relatively to the cross-sectional area of the pipes 9. The inner ends 9a of the recuperator pipes 9 are blanked, and the air upon moving from the pipe 20 into the pipes 9 is found to convert velocity head to pressure head. Because an increased pressure head is thus created, and for the reason that each nipple is of such relatively small area, the air is forced at high velocity through the short pipes or nipples 11 into the pipes 10, and in pipes 10 the velocity head is again reduced and the pressure head increased. The ends 10a of the pipes 10 are blanked, while their ends 10b are joined to a header 21. The air moves under the restored pressure head from the pipes 10 into the associated header 21, whence it flows through a bustle pipe 22 to the burner inlet pipes 6. All the while that the air is in the recuperator pipes 9, 10 and 11, heat interchange is effected; that is, heat is abstracted from the products of combustion which move through recesses 40 and this heat is added to the air moving through these pipes 9, 10 and 11. It has been found that the air in flowing through the recuperator of my invention is preheated to the desired degree, and that the pressure head of the heated air when it reaches the burners is substantially equal to the pressure which the blower imparted to the air in the conduit 19. That is to say, the air is found to be sufficiently preheated without substantial loss in pressure. It is considered that the arrangement, and the relative cross-sectional areas of the recuperator pipes 9, 10, and 11 have most to do with the particularly efficient performance of the recuperator. From the standpoint of increased efficiency it may also be noted that the air in flowing through the recuperator pipes has no returning movement—the air continues through the system of pipes without turning to flow in an opposite direction to that in which it is fed into the recuperator. An angle of 90 degrees is the greatest angle through which the air is caused to flow at each turn.

It has been mentioned above that thermostatic instrumentalities are adjusted to regulate the burners 5, and to control the temperature of the chamber 1. These instrumentalities are known to the art and for this reason are not illustrated, suffice it to say that when, in the operation of the furnace, the temperature within the chamber 1 becomes too high, the thermostatic means function to shut down the burners and permit the chamber to cool. It is desirable, however, that such cooling shall be retarded, that is, that the heat of the furnace shall be retained for a prolonged period of time. I have found that the heat of the furnace may be conserved, and the efficiency of the furnace increased, if, when the burners are shut off, the chamber 1 is closed to prevent any substantial movement of gases from the furnace to the atmosphere. To the end that the chamber 1 may be so closed, I provide shutters 23 for the ports 18. Conveniently, these shutters 23 are plates of heat-resisting steel, having apertures 24 (Fig. 3) which normally are in registry with the ports 18; that is to say, the apertures 24 are in registry with the ports 18 when the burners are operating to sustain combustion in the chamber 1. When, however, the burners are automatically shut off, the shutters 23 are caused to shift, moving the apertures 24 out of alignment with the ports 18, and thereby effecting a closure of the ports. Thus, the heat losses of the furnace are greatly reduced.

Advantageously, the shifting of the shutters may be caused mechanically, and I have indicated diagrammatically in Fig. 3 means to so operate the shutters. A pinion 25 is provided for each shutter, and the pinion is connected (by means of a chain 26) for rotation, to an electric motor 27. The motor 27 is secured to a suitable support, such as the buck-stay 28 which is fragmentarily illustrated in Fig. 3. A toothed rack is formed integrally with, or secured to each shutter 23, and each rack is in mesh with its associated pinion 25. Manifestly, an electrical circuit for energizing the motor 27 may be so organized with the thermostatic burner-controlling instrumentalities that the motor 27 is energized immediately prior to the shutting off of the burners to effect a port-closing movement of the shutters 23. When the burners are completely shut off, the shutters 23 will have been shifted to close completely the ports 18. Conversely, just before the burners are started again, electric energy may be so supplied to the motor 27, as to effect a port-opening movement of the shutters, whereupon the furnace is again adapted for free combustion.

The structure of the recuperator effects a further saving in heat. It is well known that when the door of a furnace has been opened to remove or to charge material to the heating chamber, a loss of heat results. This is for the reason that, when the furnace door (such as the door 7, Fig. 3) is opened there is an inrush of cold air, which cold air moves into the chamber of the furnace, absorbs heat, and wastefully carries the heat up through the flues of the furnace to the atmosphere. In Fig. 3 of the drawings there may be seen to best advantage a feature of construction which reduces this last mentioned cause of heat losses. The flue passages 14, 15, 16, and 17 are of unequal gas-conducting capacity. The passage (14) which has the greatest capacity for conducting gases, that is, the passage having the largest cross-sectional area, is nearest the front of the furnace, or nearest the wall of the furnace which includes the door 7 and entry 8. The passages 14, 15 and 16 vary in cross-sectional area—the areas progressively being less in proportion to the distance at which the particular passage is located from the door. Consequently, when the door of the furnace is opened, the cold, inrushing air follows the path of least resistance, and is short-circuited, as indicated by the arrows in Fig. 3, up the passages located adjacent the front of the furnace. Hence, the cooling effect upon the furnace (when the door 7 is open) is minimized; the cold air is by-passed upwardly before it absorbs as much heat as it would absorb if it were permitted to move inwardly across the heating chamber of the furnace.

What I claim is:

1. In a furnace structure including walls and a roof of refractory material, and a door covering an entrance through said walls, the combination of a flue chamber, a plurality of passages in the roof of said furnace for the conduction of the hot products of combustion of the furnace to said flue chamber, such passages having unequal capacity for the conduction of the products of combustion of the furnace and being adapted to short-circuit to the flue chamber air entering the furnace when said door is in position to uncover said entrance, recuperator pipes located in the flue chamber for the conduction of air to be preheated by said products of combustion, ports for the escape of such products of combustion from said flue chamber, and shutters and shutter-operating means for the control of said ports.

2. In a furnace structure including walls and a roof of refractory material, and a door covering an entrance through said walls, the combination of a flue chamber, a plurality of passages in the roof of said furnace for the conduction of the hot products of combustion of the furnace to said flue chamber, such passages being of unequal area and adapted to short-circuit to the flue chamber air entering the furnace when said door is in position to uncover said entrance, a recuperator pipe member located in the flue chamber for the conduction of air to be preheated by said products of combustion, such recuperator pipe member consisting of an inlet pipe, lateral pipes arranged adjacent said inlet pipe, and a series of nipples interconnecting the inlet and lateral pipes, and a header associated with said lateral pipes to receive the air which moves from the inlet pipe and through the nipples to the lateral pipes, ports in said flue chamber for affording the said products of combustion an outlet therefrom, and shutters and shutter-operating means for the control of said ports.

3. In a furnace structure including walls and a roof of refractory material, and a door covering an entrance through said walls, the combination of a flue chamber, a plurality of short passages in the roof of said furnace, which passages open immediately into said chamber for the conduction of the hot products of combustion of the furnace to said flue chamber, recuperator pipes located in the flue chamber for the conduction of air to be preheated by said products of combustion, ports in the roof of said flue chamber for the escape of such products of combustion, and shutters and shutter-operating means for the control of said ports.

4. In a furnace structure including walls and a roof of refractory material, and a door covering an entrance through said walls, the combination of a flue chamber, a plurality of passages for the conduction of the hot products of combustion of the furnace to said flue chamber, a recuperator pipe member located in the flue chamber for the conduction of air to be preheated by said products of combustion, such recuperator pipe member consisting of an inlet pipe, lateral pipes arranged adjacent said inlet pipe, and a series of short nipples interconnecting the inlet and lateral pipes, and a header associated with said lateral pipes to receive the air which moves from the inlet pipe and through the nipples to the lateral pipes, a plurality of ports in said flue chamber for affording the said products of combustion an outlet therefrom, and shutters and shutter-operating means for the control of said ports.

5. In a furnace structure including walls and a roof of refractory material, and a door covering an entrance through said walls, the combination of a flue chamber, a plurality of passages for the conduction of the hot products of combustion of the furnace to said flue chamber, such passages being of unequal area and adapted to short-circuit air which enters the furnace when said door is in position to uncover said entrance, a plurality of ports for the escape of said products of combustion from said flue chamber, and shutters and shutter-operating means for the control of said ports.

6. In a furnace structure including walls and a roof of refractory material, and a door covering an entrance through said walls, the combination of a flue chamber, a plurality of passages for the conduction of the hot products of combustion of the furnace to said flue chamber, such passages being of unequal area and adapted to short-circuit air which enters the furnace when said door is in position to uncover said entrance, and ports for the escape of said products of combustion from said flue chamber.

7. In a furnace structure including walls and a roof of refractory material, and a door covering an entrance through said walls, the combination of a recuperator chamber, a plurality of passages for the conduction of the hot products of combustion of the furnace to said recuperator chamber, a metallic recuperator in said recuperator chamber, connections to effect passage of air through said recuperator, a plurality of ports for the escape of the products of combustion from said recuperator chamber, and shutter-operating means associated with said ports to close the ports when combustion is shut down within the furnace.

8. For combination with a furnace structure, a recuperator comprising an elongate central conduit of metal, an inlet adjacent one end of the conduit for introducing air and causing the air to flow in a general axial direction in said conduit, a plurality of lateral pipes located adjacent and extending in length with said central conduit, a plurality of outlets comprising short tubes radiating from said central conduit, each of such tubes being connected to one of said lateral pipes, said central conduit being of greater cross sectional area than said lateral pipes, and outlets from said lateral pipes for the removal of air.

9. For combination with a furnace structure, a recuperator comprising an elongate central conduit of metal, which conduit is provided with an inlet adjacent its one end for introducing air in a general axial direction with respect to said conduit, which conduit is blanked at its other end, a plurality of lateral pipes located adjacent and extending in length with said central conduit, a plurality of outlets comprising short tubes extending from said central conduit, each of such tubes being connected to one of said lateral pipes, which lateral pipes are blanked at their one end and are provided with outlets at their other ends for the removal of air.

10. The structure of the next preceding claim, in which said conduit and lateral pipes are circular in cross section, and in which said central conduit is of greater cross sectional area than said lateral pipes.

In testimony whereof I have hereunto set my hand.

GEORGE D. MOOMAW.